Nov. 27, 1962 L. A. PERINI ETAL 3,066,028
PROCESS FOR MAKING A DAIRY PRODUCT
Filed April 7, 1961
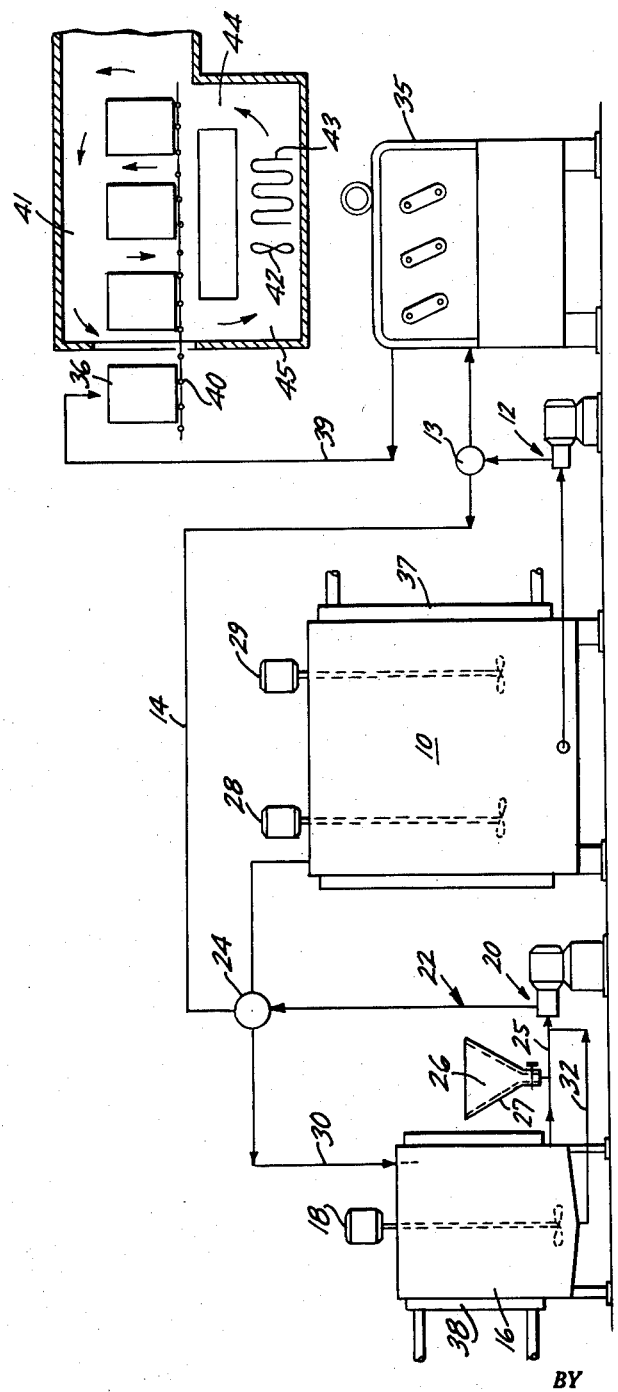
INVENTORS
HENRY LEBER
LOUIS A PERINI
BY
Curtis, Morris & Safford
ATTORNEYS 3,066,028
PROCESS FOR MAKING A DAIRY PRODUCT
Louis A. Perini, Liverpool, and Henry Leber, East Syracuse, N.Y., assignors to Dairymen's League Cooperative Association, Inc., Syracuse, N.Y., a corporation of New York
Filed Apr. 7, 1961, Ser. No. 101,570
6 Claims. (Cl. 99—60)

The present invention relates to a dairy product and this application is a continuation-in-part of applicants' prior application Serial No. 832,513, filed January 29, 1959, entitled Dairy Products and Process for Making and relates back to said application for all common subject matter. More particularly, the present invention relates to a low milk fat whipping cream having markedly improved whipping characteristics and to the process of making it.

Whipped cream is usually made from a natural dairy cream concentrated to a high milk fat content. Various foamed substitutes for whipped cream have been used; and, although they are recognized as inferior, they are often accepted because of certain recognized disadvantages of genuine whipping cream as heretofore available particularly for restaurants and bakeries. Such a whipping cream has heretofore had to have its milkfat concentrated to about 30% in order to whip easily to a stable fine-textured foam such as is recognized as a good quality of whipped cream. Even then it does not whip into a very large volume, and it may churn into butter instead of whipping to a stable foam. Such high fat whipped cream, if kept too long, tends to separate, or "weep" fluid. At best, such cream needs to be freshly whipped to realize its real quality. All this has restricted its use in bakery products to those which will be delivered to the consumer and eaten at once, i.e., without substantial storage. For many persons on restricted diet, the relatively high fat content of whipping cream is considered a disadvantage, although for others it provides needed nutrition.

As a consequence dairy product research has sought additives to stabilize whipped cream against such separation, to extend it so as to reduce caloric intake and to permit the whipping of lighter cream. For this, various known emulsifiers and/or stabilizers have been tried but without resulting in satisfactory produce which can be truly called whipped cream. Such additives have improved one or more properties but deteriorate another or other equally important qualities; e.g., "weeping" of the whipped cream may be decreased but the whip volume ("over-run") may be significantly reduced at the same time. A common disadvantage of such additives is the alteration of the taste of the cream or alternation of texture, so that it is unpalatable or of recognizably low quality.

The invention of our prior application, Serial No. 823,513 is directed to an emulsified whipping cream and method of making which produces a superior product from light to medium creams and having a taste comparable with conventional whipped cream with a much higher milk fat content. This method, in general, comprises blending a normally solid emulsifier, such as glyceryl mono-stearate, with or without di-stearate, and a sweetening and flavoring agent with a light or medium dairy cream. The glyceryl mono-stearate and di-stearate emulsifiers are waxy solids at room temperatures and in accordance with one method described in our prior application, the emulsifiers are added as a comminuted solid and mixed with the cream at an elevated temperature in the range of 140° F. to 210° F. for the period of time necessary to produce a uniform distribution and pasturization of the mixture. The mixture was then cooled by passing it over a surface cooler and packing it in containers, such as cans.

It was found that there was considerable variability in the product in the different containers. The product in certain containers would whip while the product in other containers could not be whipped. This was particularly perplexing when the variability might be encountered in the same batch.

It is an object of the present invention to produce a whipping cream which has uniform whipping characteristics throughout a batch and between different batches.

It is another object of this invention to produce a whipping cream of highest quality made from natural fresh dairy cream but without excessive concentration of butter fat and without adulteration.

It is a further object of this invention to produce this useful whipping cream by a process readily adaptable to existing dairies without need for expensive new equipment.

It has been known that various emulsifiers, among them the lower glycol stearates, particularly glyceryl mono-stearate, would cause cream of low fat content to whip; but the taste was not acceptable. Our prior application is directed to an emulsified whipping cream and method of making which produces a superior product from light or medium cream and having a taste comparable with conventional whipped cream of a much higher fat content. Our invention was based on the discovery that if the lower glyceryl esters of fatty acids in animal fats and vegetable oils are used in proportion substantially of the range 1–2% by weight of the cream, a light or medium dairy cream can be converted into a high quality whipping cream acceptable to the baking industry as well as to the gourmet. This is surprising as previous efforts to use this material had established that 0.45% was the limit beyond which the produce is so unpalatable as to be unsalable; and that, with so small small a percentage, a light or medium cream would not whip satisfactorily. Our prior application also included the discovery that ordinary sweetening and flavoring additions overcome the objection to glyceryl mono-stearate and like monoglycerides when used in amount of 1–2% in cream; although, with higher percentage, the sweetening and flavoring agents tend to accentuate a disagreeable taste.

Glyceryl mono-stearate is a waxy solid at room temperature which has been found very difficult to disperse in cream. Relatively low amounts, up to 0.5% by weight, had been dispersed in milk and cream by violent agitation in high speed blenders (e.g., "Waring Blendor") and similar laboratory apparatus ill-suited to commercial dairy use. It had been dispersed also by colloid mills and other special emulsifying apparatus, but it seemed evident that it could not be used without costly additions to equipment ordinarily found in a dairy. We discovered that glyceryl mono-stearate and the like can be easily dispersed in light cream by passing such ester and cream together through ordinary centrifugal pumps available for conveying milk and cream through pipes in existing dairies. The impact and shear effects of the impeller blades, and their narrow clearances from the pump shell, prove to be surprisingly well adapted to disperse the stearate into colloidal particles or along the aqueous or fat interfaces, under conditions of pumping cream in the dairy. This discovery makes possible commercial production of the improved whipping cream in dairy plants using conventional process equipment.

For best whipping characteristics, we use a fresh dairy cream having a maximum range of 18% to 28% milk fat by weight, but preferably in the range of 18 to 22% milk fat by weight. Broadly stated, between one and two percent by weight of the glyceryl mono-ester is added. This amount can be increased somewhat, but taste will be impaired when more than 2% is used, and any improvement of whipping properties obtained by such high concentrations is not sufficient to compensate for such impairment. The best range is from 1.3 to 1.8% by weight, as within this range one achieves significant and essential improvement of the several important properties of whipped cream, i.e., stiffness, stability, resistance to "weeping" and satisfactory over-run, without serious deterioration of flavor.

The additive, which functions both as an emulsifier and stabilizer, is chemically a monoester of a polyhydric alcohol and an edible fatty acid. The additive is commercially available in suitably purified form and may be of the types described and claimed in U.S. Patents Nos. 2,634,234, 2,634,278 and 2,634,279 but not necessarily limited to these types of emulsifier and stabilizer.

It has been found also that the glyceryl di-stearate can be used in this invention, especially in the amount up to that of the monoglyceride. The monoglyceryl ester of oleic acid can be present, and in general, the monoglyceryl esters of the fatty acids of animal fats and vegetable oils ordinarily used in human foods.

Typical of suitable commerically available emulsifier-stabilizer preparations useful for this invention are:

(1) *Glyceryl Mono-Stearate*

Chemical and physical data:
Mono-ester content____ 90% minimum by weight).
Saponification value___ 155–165.
Iodine value_____ 40 (approx.).
Glycerol content_____ 1% (max.).
Free fatty acid
 (as oleic)_____ 1.5% (max.).
Congealing point_____ 58° C. (approx.).
Clear point_____ 62° C. (approx.).

(2) *Glyceryl Mono and Di-Stearate Mixture*

Chemical and physical data:
Mono-ester content____ 40–44% (by weight).
Iodine value_____ 55–60.
Glycerol content_____ 1% (max.).
Free fatty acid
 (as oleic)_____ 0.5% (max.).
Melting point_____ 50° C. (approx.).

One serious defect, which has heretofore prevented the use of the mono and di-glyceryl esters of the fatty acids (as stabilizers and/or emulsifiers) in edible dairy products, is the unpalatable flavor of the free fatty acid. It appears impossible to avoid the presence of some free fatty acid, as the ester undergoes some hydrolysis. It is a feature of the invention that it enables one to avoid the unpalatable taste in the modified whipping cream. For reasons not fully understood, the addition of a sweetening agent equivalent to about 10 to about 15% by weight of cane sugar and a trace of flavoring extract makes both the whipping cream and the whipped cream of excellent taste and palatability. Ordinarily the best sweetening agent is sucrose, and ordinarily the best flavoring agent is vanilla extract. Other sweetening agents include glucose, honey, sorbitol and similar substances; even saccharin may be used but with the usual adjustment of proportions to give equivalent sweetening effect.

The glyceryl mono-stearate is not soluble in aqueous liquids, such as light whipping cream; and, in fact, it has proven very difficult, under practical operating conditions to produce a satisfactory uniform dispersion of as small an amount as one percent in an aqueous material, such as cream.

We discovered that the glyceryl mono-stearate can be readily dispersed into a milk product in existing dairy plants. Our novel process features the use of apparatus generally available in existing milk processing plants, namely, a high speed centrifugal pump of sanitary design. Thus, by our invention, dispersion of the emulsifier for producing our novel whipping cream is broadly characterized by the step of transporting a mixture of emulsifier and light or medium cream (i.e., with at least 18% and less than 28% butter fat) by action of a high speed centrifugal dairy pump. Advantageously, the cream has at least 18% by weight milk fat and advantageously, is treated while warm (e.g., at a pasteurizing temperature). Thus, the emulsifier is thoroughly and stably dispersed in the cream without special equipment.

In the accompanying drawings we have shown, diagrammatically, dairy apparatus suitably arranged for carrying out the present invention. In this apparatus a standard pasteurizing vat 10 receives a supply of fresh dairy cream. A pump 12 draws off cream from the bottom of the vat 10 through a pipe connection and delivers it through valve 13, pipe 14 and valve 24 to a pre-mix tank 16. Pre-mix tank 16 is provided with a propeller-type mechanical mixer 18 which is directed in the tank so as to maintain a vortex in which any unmixed glycol stearate will be carried down into the mass of liquid in the tank. From the bottom of the pre-six tank 16 the mixture is drawn off through a pipe connection 32 by a centrifugal pump 20 and delivered through the pipe connection 22 to the four-way valve 24, by which the mixture can be recycled through connection 30 to the pre-mix tank 16 or passed on to the tank 10. A connection 25 is shown connected between the pre-mix tank 16 and pump 20 in parallel with the connection 32 and the connection has a feed hopper 26 having a heating jacket 27 and from which the glyceryl stearate is fed into the cream flowing toward pump 20. The glyceryl stearate may be supplied in comminuted solid form, but advantageously it is rendered liquid by heating before being introduced into the cream.

Mechanical stirrers 28 and 29 are provided in the vat 10 to thoroughly mix into the cream the pre-mix supplied to the vat through pipe 22 and the valve 24 and its connection. Valve 13 is shown as a three way valve by which the cream from the pump 12 can be recycled through pipe 14 and valve 24 or can be passed on into the homogenizer 35.

In accordance with the present invention the modified cream product is thoroughly mixed and blended while maintained at an elevated temperature of, for example, 175° F. and is then packed in containers 36 at the elevated temperature before cooling. The product is maintained at the elevated temperature by means of a heating medium supplied to heating jackets 37 and 38 on the tanks 10 and 16, respectively. The product at elevated temperature is delivered from the homogenizer 35 through a pipe line 39 into the containers 36 in the form of cans mounted on a conveyor 40. Conveyor 40 moves the containers 36 through a cooling chamber 41 in which air is circulated by a fan 42 over a refrigerating coil 43 and a duct 44 leading to the chamber. A second duct 45 leads from the chamber 41 back to the refrigerating coil 43 so that the fan 42 continuously recirculates the chilled air through the chamber 41 to cool the modified cream product in the containers at a relatively slow rate with the product quiescent as distinguished from rapid cooling by flowing the product over a surface cooler. After the product has been cooled to a temperature below 50° F. it is stored until it is delivered to a bakery or other place where it is sold or used.

The cream is advantageously heated to a temperature in the range of 160° F. to 200° F. (or, at the outside, 145° F. to 210° F.) by introducing it into a pasteurizing vat 10 and the temperature then held at 165° F. to 175° F. by the controlled heating medium supplied to the jacket 37 of the vat. Generally stated, the temperature of the cream during the mixing is above the cloud point of the emulsifier, but not so high as to leave an unpalatable "boiled" taste in the cream. Heating above about 170° F. to 180° F. develops an anti-oxidant in the cream which results in better frozen storage, where that is necessary, but it gives the cream a "boiled" taste. Although this may be objectionable to users, it tends to disappear on storage, so that cream which is to be stored may advantageously be treated at high temperatures, even up to 210° F.

During this heating the sweetening agent, e.g., about 10%–15% of sucrose or equivalent, is dissolved in the cream. The sweetened cream is then drawn off to the centrifugal pump and the glyceryl mono-stearate added in transit.

The glyceryl mono-stearate is supplied commercially as a waxy solid with a relatively low melting point (e.g., "Myveral 1800" or "1830" or "Atmul 80". As described in our prior application Serial No. 823,513 the glyceryl mono-stearate has been successfully introduced as small pieces of the waxy solid into the vat of hot cream and then, after it is softened, passing the mix through a high speed centrifugal pump with unrestricted flow less than the full capacity of the pump as herein described; or the waxy pieces can be fed into the cream in the input stream of the high speed centrifugal pump as small pea-sized pellets; or it can be melted and sprayed into the cream; or it can be melted and fed into a flowing stream of the cream. Advantageously, the latter method is used by melting the waxy emulsifier in the hopper 26 to which a heating medium is supplied to the jacket 27. Care should be taken to avoid oxidative break down or other production of objectionable products, such as free fatty acids, by excessive or extended heating.

The novel use of a high speed centrifugal pump as means of dispersing or solubilizing the additive permits considerable latitude of operation. The emulsifier can be added to a part of the cream and the resulting mixture then blended with the rest of the cream or the emulsifier can be added to all of the cream. The emulsifier may be added at the rate of 10 to 20 pounds per minute and circulated in the branch circuit including the centrifugal pump 20, conduit 22, valve 24, conduit 30, tank 16 and conduits 25 and 32 until the emulsifier content constitutes 10% to 20% by weight of the total cream-sucrose mixture and this addition is made immediately prior to introduction into the intake of the high speed centrifugal pump.

One highly satisfactory centrifugal pump has a throughput capacity of 108,680 pounds of product per hour operating at 3500 r.p.m. It has a pump shell measuring 7 inches in diameter and 1⅜ inches thick with 1½ inch inside diameter axial inlet and 1¼ inch inside diameter tangential discharge openings and a flat diametric blade impeller 4⅛ inch long fitted in the interior of the pump shell, and secured on the end of the pump shaft. Better dispersion and/or solubilization results were obtained when the flow through the pump was unrestricted, than when the pump was starved or the discharge valved.

When the emulsifier is being added it is best to make a pre-mix by recirculating some of the cream through the centrifugal pump 20 for a short period of time, e.g., 10 to 15 minutes after adding all of the glyceryl mono-stearate. During this recirculation the mixture is pumped to and from a separate pre-mix vat keeping the temperature of the pre-mix above about 160° F., meanwhile agitating the liquid in the vat, e.g., by a propeller-type stirrer so as to avoid stratification and local over-cooling.

At the end of the recirculation period, the valves 13 and 24 are adjusted to deliver the pre-mix into the bulk of the cream, also heated to 165° F. to 175° F. The pre-mix which carries from 5 to 20% by weight of the emulsifier, flows from the pump 20 through pipe line 22 and valve 24 to tank 10 and the mixture recirculated from the tank 10 by the pump 12 through the valves 13 and 24 and pipe line 30 back to the pre-mixed tank 16. This recirculation is continued until the emulsifier is thoroughly mixed and blended in the cream. Furthermore, the emulsifier is readily distributed throughout the bulk of the cream by agitation, as by a means of a mechanical stirrer.

At this recycling stage, pasteurization of the cream can be concurrent with solubilizing and dispersion of the emulsifier. The modified cream is held at a temperature of from 160° F. to 200° F., preferably 165° F. to 175° F., for about 30 minutes. After 25 of the 30 minutes have elapsed, the flavor agent is added, which for whipping cream is advantageously vanilla extract. Almond extract, lemon extract, etc., can be substituted if desired. It is added in small amount, to taste. Thereafter, the product is advantageously homogenized by conventional techniques, e.g., at 2500 p.s.i. and 500 p.s.i. and then chilled.

It has been discovered that the modified cream product should be packed in containers while still hot to maintain the uniform whipping characteristics of the product in all portions of a batch and in different batches. Accordingly, the product is delivered from the homogenizer 35 directly into containers while still hot and the containers and contents thereof cooled slowly while the material is quiescent. Furthermore, the packaging of the material while hot and thereafter cooling eliminates spoilage because the material is packed at a temperature at which the microorganisms are destroyed in the package before cooling is effected. Previously, the cooling on a surface cooler almost invariably included some mold spores or other micro-organisms which could impair the quality of the product.

The product of the invention is a whipping cream of from 18% to 22% milk fat; and is a soft plastic in physical structure and appearance. It is a dairy product of lower milk fat content than ordinary whipping creams, yet it always whips into a large volume of whipped cream of exceptional stiffness and stability. The whipped cream does not exude fluid on standing. Furthermore, the whipping cream shows no inclination to churn into butter when whipped.

EXAMPLE I

As an example of both the product and process of the invention, 4,500 pounds of product, whipping cream, is made from 3,937.5 pounds of cream having a milk fat content of 20.57% by weight. This is introduced into a pasteurizing vat, illustrated diagrammatically at 10 in FIGURE 1 of the accompanying drawing, and heated to 165° F. to 175° F. To this is added with agitation 495 pounds of sucrose which quickly dissolves in the heated cream. 440 pounds of the sweetened cream is pumped through pump 12, 3-way valve 13 and line 14 to a pre-mix tank 16 having a propeller-type mechanical mixer 18 for agitation of the contents. The tank contents are drawn off through a high speed centrifugal pump 20 of sanitary design having a discharge rate of 108,680 pounds per hour, and at first recycled through pipe 22 and 4-way valve 24 to the pre-mix tank 16.

67.5 pounds of the glyceryl mono-stearate in liquid phase is fed into the circulating sweetened cream at 26, at the intake of the centrifugal pump 20 at a rate of 20 pounds per minute (1.1% of the cream throughput). For this purpose the hopper 26 may be heated by steam at 5–15 p.s.i. pressure in the jacket 27 or by circulating hot water in the jacket at 190° F. to 200° F. (or by electric heating element). The emulsifier, when melted by this heating, is then mixed into a stream of the sweetened cream, advantageously being fed therein by an aspirator, injector or eductor. After all of the glyceryl mono-stearate has been added, recirculation to tank 16 is continued for 10 to 15 minutes and then the pre-mix output from the pump is diverted by valve 24 to the pasteurizing vat 10 where it is mixed with the bulk of the sweetened cream. Agitation is maintained by two mechanical stirrers 28, 29 operating in the pasteurizing vat.

The now mixed product is held in the vat with gentle mixing, still at a temperature of 165° F. to 175° F., for twenty-five minutes. At this time vanilla extract is added, as required for optimum taste. After an additional five minutes mixing under these conditions, the product is homogenized in a homogenizer equipped with two homogenizing valves, at 2500 p.s.i. and 500 p.s.i.

The product while still at an elevated temperature is delivered to containers 36 on, for example, a conveyor belt or other support 40 which delivers them through a chilling room to cool the product in the containers to 50° F. or lower. The containers 36 and the products therein are cooled relatively slowly while in a quiescent state by circulating chilled air from a refrigerating coil 43 over the container.

The product is of excellent taste, and contains 18.00% milk fat, 11.00% sucrose and 1.50% glyceryl mono-stearate, plus the small addition of vanilla flavoring (all percentages by weight).

EXAMPLE II

Fresh dairy cream, separated to about 20.57% milk fat, is put into a pasteurizing vat 10 and sweetened with sucrose to 11% sugar content, the mixture being meanwhile heated and agitated until it reaches a temperature in the range 160° F. to 185° F.

A portion of this sweetened cream is then drawn off by pump 12 and passed through valve 13, pipe 14, valve 24 and pipe 30 into pre-mix tank 16, all as in Example I. Glyceryl mono-stearate emulsifier is added as pea-sized chunks to the liquid cream in the pre-mix tank. The hot liquid and emulsifier are agitated in the tank until the emulsifier is soft, at which time the pre-mix is drawn off to the pump 20, the agitator 18 being directed so as to maintain a vortex down which the floating chunks of emulsifier pass to the outlet pipe 32. The pump 20 disperses the monoglyceride emulsifier thoroughly in the cream.

From the pump 20 the pre-mix is directed through the valve 24 (now turned to make connection to the pasteurizing vat 10) and thence into the vat 10 where the pre-mix is blended with the rest of the sweetened cream.

Proportions and temperatures and subsequent treatment may be the same as in Example I.

EXAMPLE III

Similarly the glyceryl mono-stearate could be added with an equal amount of the glyceryl di-stearate as available in the previously mentioned commercial form. In that event, it is desired that at least 1% by weight of the monoglyceride be incorporated into the sweetened cream. The product is then processed as in Examples I and II. The product leaving the outlet from the pump is directed by valve 24 back through the connection 30 to the vat 16 until all of the emulsifier is dispersed therein, or alternatively the cream and sweetener may be fed into vat 16 and pre-mixed therein and the cream may pass once through the aspirator, which feeds therein a stream of the melted emulsifier equal to 1.5% by weight of the cream, and then once through the centrifugal pump 20 and on through the pasteurizing and homogenizing treatments, finally being filled into containers and cooled to 50° F., or lower, for storage and distribution.

The following representative data show the influence of the concentration of the glyceryl mono-stearate on the several important properties of 18% milk fat whipping cream.

TABLE I

[18% milk fat cream whipped for 15 min.]

| Concentration of glyceryl mono-stearate, percent by weight | Percent overrun | Relative stiffness [1] (grams/in.[2]) | Drainage from whipped product,[2] | |
|---|---|---|---|---|
| | | | 24 hrs. at 40° F. | 48 hrs. at 40° F. |
| 1 | 1.0 | 218 | 66 | 3.0 | 4.0 |
| 2 | 1.2 | 277 | 78 | 2.0 | 2.0 |
| 3 | 1.4 | 245 | 103 | 0 | 0.5 |
| 4 | 1.6 | 227 | 110 | 0 | 0 |
| 5 | 1.8 | 227 | 120 | 0 | 0 |

[1] A 200 ml. beaker was filled with whipped product and a one-inch square plate was forced through the product resulting in a comparative stiffness reading.
[2] 100 grams of whipped product was stored on an 80 mesh screen square and the fluid draining therefrom collected and measured.

While the process of the invention has been described in considerable detail with reference to the incorporation of the glyceryl mono-stearate into cream of at least 18% milk fat, it will be understood that the invention is clearly applicable to incorporation of such materials of limited solubility into other diary products and the like. Therefore, variations and modifications in both the product and process may be effected by the skill of this art within the spirit and scope of the invention.

We claim:

1. A process of making an improved whipping cream which comprises heating dairy cream having at least 18% and less than 28% milk fat to a temperature in the range of 160° F. to 200° F., mixing the heated cream with glyceryl mono-stearate in a proportion in the range of 1% to 2% by weight of the cream at the elevated temperature of the cream, agitating and circulating the mixture at the elevated temperature, adding sugar and flavoring to the mixture, homogenizing said mixture, packing said mixture in containers while at said elevated temperature, and then cooling the modified cream in said containers whereby to produce a product in each of the containers having uniform whipping characteristics.

2. A process for making improved whipping cream in accordance with claim 1 in which the glyceryl mono-stearate is in a heated liquid phase when mixed with the heated cream.

3. A process for making improved whipping cream in accordance with claim 2 in which the sugar is mixed with the cream and the mixture heated to an elevated temperature before the glyceryl mono-stearate is added.

4. A process for making an improved whipping cream in accordance with claim 3 in which the modified cream product is slowly cooled in a quiescent state after packing in the containers to a temperature below 50° F.

5. A process for making an improved whipping cream in accordance with claim 1 in which the cream has at least 18% and less than 22% by weight of milk fat and in which the mixing comprises the steps of first mixing the glyceryl mono-stearate with a portion of the cream, recirculating the mixture and thereafter blending the mixture with the remainder of the cream.

6. A process of making an improved whipping cream in accordance with claim 1 in which a mixture of glyceryl mono-stearate and di-stearate in a proportion in the range of 1% to 2% by weight is added to the heated cream.

References Cited in the file of this patent

UNITED STATES PATENTS 1,816,339    Musher _____ July 28, 1931
1,958,295    Christensen et al. _____ May 8, 1934

(Other references on following page)

UNITED STATES PATENTS

| | | | |
|---|---|---|---|
| 2,049,591 | Rafn | | Aug. 4, 1936 |
| 2,137,899 | Phelps | | Nov. 22, 1938 |
| 2,407,027 | Mason et al. | | Sept. 3, 1946 |
| 2,931,730 | Schram | | Apr. 5, 1960 |
| 3,010,830 | Berndt et al. | | Nov. 28, 1961 |

FOREIGN PATENTS

| | | |
|---|---|---|
| 518,050 | Great Britain | Feb. 15, 1940 |

OTHER REFERENCES

Jacobs, M. B.: "Synthetic Food Adjuncts," 1947, Van Nostrand Co., New York, page 253.

Blanch, F. C.: "Handbook of Food and Agriculture," 1955, Reinhold Pub. Co., N.Y., pages 653 and 655.

Data Sheet distributed by Distillation Products Industries, Division of Eastman Kodak Company of Rochester, Jan. 3, 1955, entitled "The Use of Mineral Distilled Monoglycerides in the Preparation of Whipped Foods Based on Dairy Products," 4 pages.